United States Patent [19]
Kluczynski et al.

[11] 4,181,271
[45] Jan. 1, 1980

[54] SPOOL WITH EXTERNAL HOOKS FOR WINDING MATERIAL IN THE FORM OF TAPE

[75] Inventors: Achim Kluczynski, Overath; Erik Altmann, Muehlheim, both of Fed. Rep. of Germany

[73] Assignee: Agfa-Gevaert, A.G., Leverkusen, Fed. Rep. of Germany

[21] Appl. No.: 949,398

[22] Filed: Oct. 10, 1978

[30] Foreign Application Priority Data
Oct. 13, 1977 [DE] Fed. Rep. of Germany ....... 2745981

[51] Int. Cl.² ........................................... B65H 75/28
[52] U.S. Cl. .................................................... 242/74
[58] Field of Search ............. 242/74, 71.8, 125, 125.1; 197/175

[56] References Cited
U.S. PATENT DOCUMENTS

| 3,361,380 | 1/1968 | Mizutani | 242/74 |
| 3,383,069 | 5/1968 | Riedel | 242/74 |

FOREIGN PATENT DOCUMENTS
2444106 3/1976 Fed. Rep. of Germany ............ 242/74

Primary Examiner—Edward J. McCarthy
Attorney, Agent, or Firm—Connolly and Hutz

[57] ABSTRACT

The invention relates to a spool for winding elastic material in the form of tape, in particular film, with external hooks comprising a cylindrical spool core with an opening on and in which the hooks are formed and preferably also two flange discs and the film having perforations for its attachment to the hooks in the spool.

7 Claims, 3 Drawing Figures

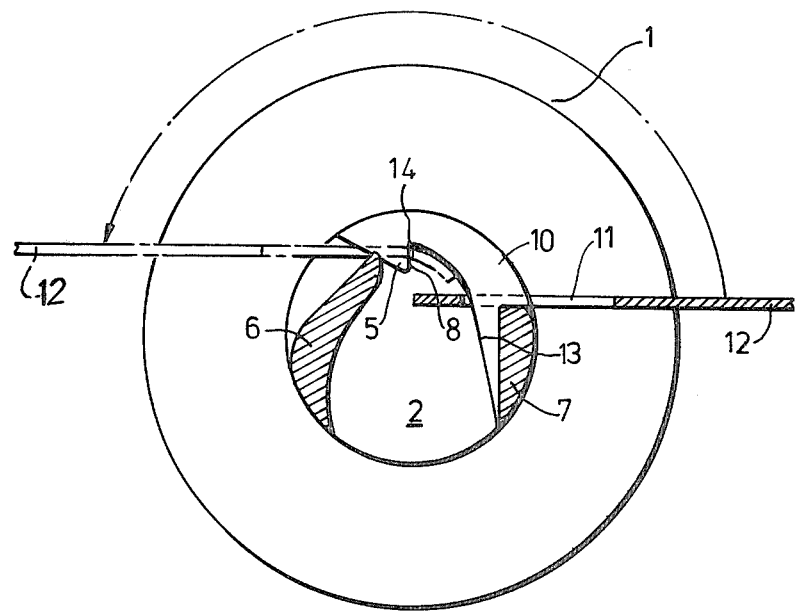
FIG. 2 (2-2)
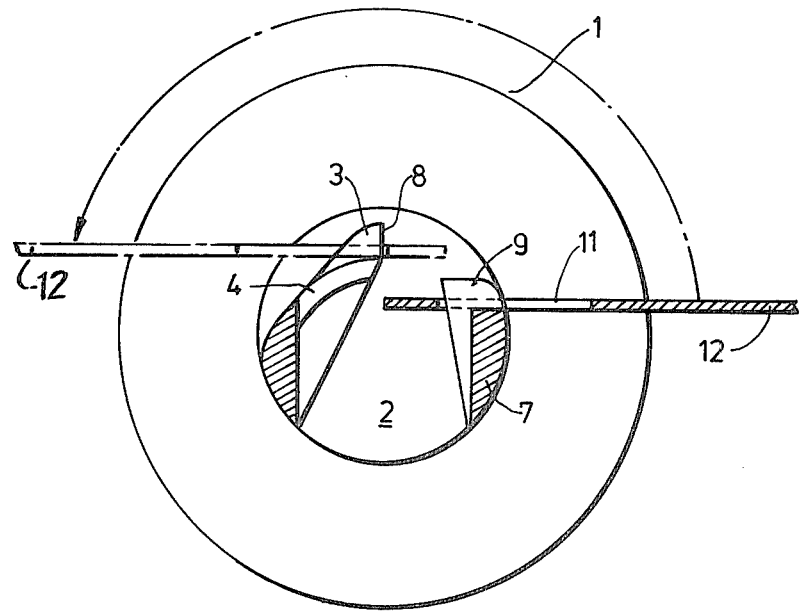
FIG. 3 (3-3)

SPOOL WITH EXTERNAL HOOKS FOR WINDING MATERIAL IN THE FORM OF TAPE

This invention relates to a spool with external hooks, comprising a cylindrical spool core with an opening on and in which the hooks are formed and preferably also two flange discs, for winding elastic material in the form of tape, in particular film, the film having perforations for its attachment to the hooks in the spool.

Numerous spool designs are known for winding various types of tape material and various methods have been used to solve the problem of fixing the tape to the spool for winding it. For example, the tape may be wrapped round the spool or glued, riveted, clamped or hooked on to or into a slit in the core of the spool. The present invention relates to spools with hooks on to which the tape of film is hooked by its perforations.

Spools such as double hooked spools, for example, are known for winding perforated 35 mm films. These spools have a slit in their core, in which hooks and separate guide surfaces are formed. The end of the film, which has a perforation, is pushed into this slit and the guide surfaces on the two sides of the hook bend the film over the hook until the hook snaps into the perforation in the film. Once the perforation is in place over the hook, the guide surfaces, in combination with the stiffness of the film, prevent accidental release of the tape from the spool.

These known forms of spool have the disadvantage that in an automatic process of hooking the tape over the spool, the spool is moved into a certain position in which it must remain until this process is accomplished. This, of course, takes time and is therefore detrimental to efficiency. Another disadvantage of these spools is that only relatively weak forces of tension can be transmitted so that in many cases the film may be torn from the spool and thus become unusable.

In U.S. Pat. No. 3,361,380, there is described a combination of spool and film tape in which two hooks are provided in a slit in the spool and two apertures in the film tape so that the tape will have a firmer hold on the spool. It is only under certain conditions that a film can be securely fixed to such a spool and it is not possible to begin the winding of the film on to the spool simply by rotation.

In German Offenlegungsschrift No. 2,444,106 there is described a spool with an external hook which is said to hook the film in rotation and secure it against detachment by means of guide surfaces provided on the two sides of the hook. It is found that the hooking of the film on to this spool is insecure and the failure rate when the spool is used for the manufacture of film cartridges with spools is therefore high. The guide surfaces provided to prevent detachment from the hook are not sufficiently reliable in their action. The amount of tension which can be transmitted is similar to that in conventional spools with hooks and is not sufficient.

It is an object of the present invention to provide a spool which allows for efficient hooking of the film into the spool in rotation, ensures a secure hold between the film and the spool and even enables the film to be wound in the opposite direction once it has been hooked into the spool without any risk of its becoming detached, and which produces no pressure imprints on sensitive tapes.

In accordance with the invention there is provided a spool for winding elastic material in the form of tape comprising a cylindrical spool core having an opening therein, one or more catch hooks with counter hooks formed on and in the said opening and one or more pairs of opposite retaining elements for hooking the tape, which has apertures therein, on to the spool while the spool is in rotation, in such a manner that if the direction of winding of the spool is reversed after the tape has been hooked into position, the tape remains firmly and securely connected to the spool.

It is surprisingly found that the formation of the catch hook with a counter hook pointing in the direction of the axis of the spool core provides a secure means of attachment once the perforation in the film has been caught on the hook, a process which may also take place during rotation of the spool. The catch hook and counter hook are formed on a slot in the spool core. Pairs of so called retaining elements situated opposite each other are formed on the walls of the slot at some distance next to the one or more catch hooks. The surfaces provided on these retaining elements for retaining the tape are so formed that they are placed uniformly over the perforations in the tape when the tape has been hooked into position. The roots of the catch hooks and the roots of the retaining elements together transmit the forces of traction between the tape and the spool.

The formation of the spool with catch hooks and retaining elements on the side of a slot in the core of the spool and counter hooks and counter retaining elements on the opposite side enables the direction of rotation of the spool to be reversed, the tape remaining firmly hooked to the spool. To achieve this, it is desirable that the holding surface of the catch hook in the region of the root of the hook should be larger in the direction of the centre of the spool than the root of the counter hook.

It has also been found that in order to prevent pressure marks on the tape, the catch hooks and retaining elements should be situated within the circumference of the core of the spool and the weight of the tape should be carried while the tape is being wound entirely by the cylindrical part of the core close to the flanges.

The height of the retaining elements situated adjacent to or between the catch hooks is preferably chosen so that the gap left between them is large enough to enable the end of the tape to be slipped into the slot.

According to a preferred embodiment of the invention, another feature which makes the tape very much more secure against detachment from the hooks is that guide surfaces are formed to extend into the slot but only sufficiently deeply to enable the tape to drop into the slot.

A further improvement is achieved if the guide surfaces are higher than the lowest tip of the counter hook on the catch hook, which tip points in the direction of the axis of the spool core.

The particular formation of the core with a slot, catch hooks, counter hooks and retaining elements fulfills the problem which the invention sets out to solve and has considerable advantages over known spools. The formation of the freely projecting catch hook enables the tape to be securely hooked into position on it while the spool is in rotation. Moreover, while the tape is being hooked into position, the spool may rotate at the same speed as during the normal winding process. The retaining element which is provided on the wall of the catch hook at the same level serves to prevent sudden peaks of tension while the tape is being hooked into position during rotation of the spool and it also prevents the film being torn from the spool after exposure in the camera. The tension forces which can be transmitted with this combination of catch hooks and retaining elements are considerably greater than in the known spools. Another advantage of the spool according to the invention is that the tape is secured against detachment from the hooks by the arrangement of counter hooks and further retaining elements. This special arrangement enables approximately the same tension to be transmitted in the opposite direction of winding as in the normal direction of winding.

BRIEF DESCRIPTION OF THE DRAWINGS

Novel features and advantages of the present invention will become apparent to one skilled in the art from a reading of the following description in conjunction with the accompanying drawing wherein similar reference characters refer to similar parts and in which:

FIG. 2 is a cross-sectional view taken through FIG. 1 along the line 2—2; and

FIG. 3 is another cross-sectional view taken along the line 3—3, through FIG. 1.

Figure 1:
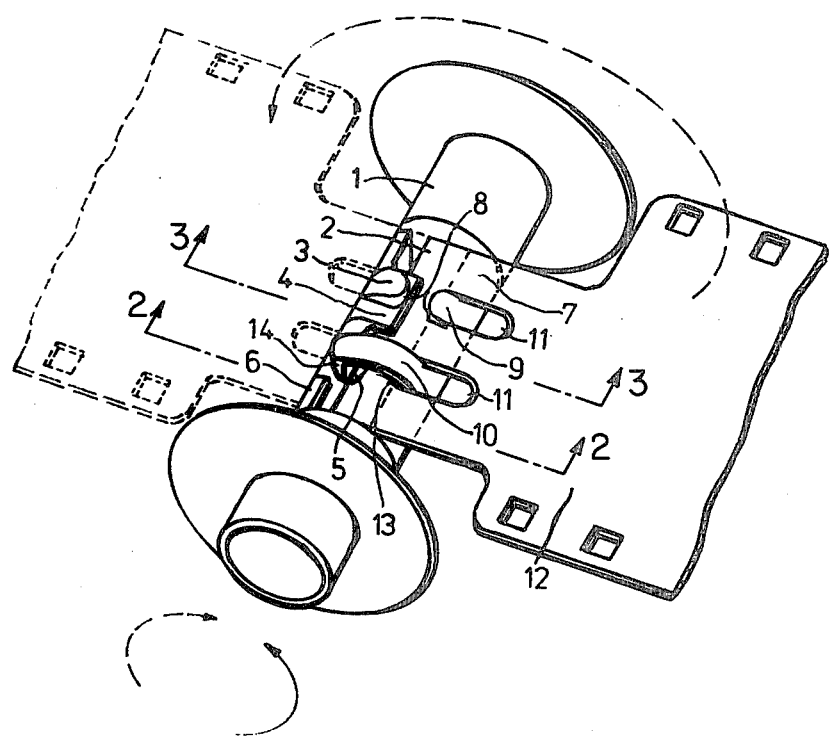
FIG. 1 is a three-dimensional view showing a winding spool for photographic film, which is one embodiment of this invention having a piece of film engaged therewith when winding in the principal direction and another piece of film engaged therewith when winding in opposite direction, shown in phantom outline.

A spool 1 has a slot 2 which opens into the spool core, in and on which slot are arranged a catch hook 10, a counter hook 5 and retaining elements, for example two such elements 3 and 9. The catch hook 10 is so formed that its external surface exactly follows the radius of curvature of the spool core, the measurement of the retaining surface 8 in the region of the root 13 of the catch hook to the centre of the core being greater than the measurement from the centre of the core to the root 14 of the counter hook. Next to the catch hook, on the same side of the wall of the slot, there is a retaining element 9 but its height is limited by the amount of space required between the retaining elements 3 and 9 to enable the film to slip into the guide surfaces 4 and 6. The film 12 is carried towards the spool core in such a direction that the catch hook 10, which is exposed under its tip above the guide surface 6, can snap into a perforation 11 in the film 12 and then rest against the shoulder 7 of the wall of the catch hook. Just before the film 12 is placed on the shoulder 7, the second perforation 11 in the film moves over the retaining element 9 so that the force with which the catch hook 10 holds the film is approximately doubled. When the film 12 has reached its end position on the shoulder 7, the end of the film has at the same time snapped into position under the guide surfaces 4 and 6, thereby preventing accidental release of the film 12 from the spool 1.

In some cameras, it is possible to unwind the exposed film in the wrong direction. To prevent the film unhooking from the spool under these conditions, it is necessary to provide additional hooks in the opposite direction. The counter hooks 5 provided on the tip of the catch hook 10 and the retaining element 3 seated on a plateau 4 fulfill this function. If the film 12 is placed in the opposite direction (see broken lines), it is caught on the counter hook 5 and retaining elements 3 so that substantially the same forces can be transmitted as in the correct direction of winding. If the film 12 is thus turned over into the opposite winding direction, the same perforations 11 in the film come into operation as in the prescribed direction of winding. The retaining surfaces 8 of the retaining elements and those of the catch hook are all situated at the respective levels required for effective holding of the film.

When winding highly sensitive tapes, such as films, on to spools, any parts projecting above the circumference of the core of the spool would damage the film by premature exposure due to pressure. The catch hooks 10 and retaining elements are therefore so formed that they remain within the contour of the winding surfaces which are left on the parts of the spool core situated adjacent the flange discs, and these parts of the core carry the wound film.

What we claim is:

1. A spool for winding elastic material in the form of tape comprising a cylindrical spool core having an opening therein, one or more catch hooks with counter hooks formed on and in the said opening and one or more pairs of opposite retaining elements for hooking the tape, which has apertures therein, on to the spool while the spool is in rotation, in such a manner that if the direction of winding of the spool is reversed after the tape has been hooked into position, the tape remains firmly and securely connected to the spool.

2. A spool according to claim 1, wherein the measurement of a retaining surface of the catch hook in the region of the root of the catch hook to the core of the spool is larger than that of the root of the counter hook.

3. A spool according to claim 1 or 2, wherein the or each catch hook and counter hook and the retaining elements are situated within the circumference of the spool core so that during winding the tape is carried only by cylindrical parts of the spool core adjacent the ends thereof.

4. A spool according to claim 1 or 2, characterized in that the or each pair of retaining elements situated adjacent to or between the catch hooks are of such a height that the gap left between them is sufficient to enable the end of the tape to slip into the said opening.

5. A spool according to claim 1 or 2, wherein guide surfaces extending into the opening are formed on it to prevent accidental release of the tape from the hooks which guide surfaces only project so far into the said opening that the tape can fall thereinto.

6. A spool according to claim 5, wherein the guide surfaces are higher than the lowest tip of the or each counter hook on the catch hook, which tip points in the direction of the axis of the spool core.

7. A spool according to claim 1, wherein a flange disc is provided at each end of the spool.

* * * * *